United States Patent [19]

Shibuya

[11] Patent Number: 4,666,018

[45] Date of Patent: May 19, 1987

[54] OSCILLATION CONTROL APPARATUS FOR OSCILLATION TYPE VEHICLE

[75] Inventor: Masanori Shibuya, Tokyo, Japan

[73] Assignee: Honda Giken Kogyo Kabushiki Kaisha, Tokyo, Japan

[21] Appl. No.: 804,299

[22] Filed: Dec. 3, 1985

[30] Foreign Application Priority Data

Dec. 7, 1984 [JP] Japan .............................. 59-258776

[51] Int. Cl.[4] .............................................. B60G 9/02
[52] U.S. Cl. ................................. 180/213; 280/112 A
[58] Field of Search ................... 180/219, 213, 210; 280/112 A, 489

[56] References Cited

U.S. PATENT DOCUMENTS 3,938,609 2/1976 Kensaku et al. ................. 280/112 R
4,515,390 5/1985 Greenberg ....................... 280/112 R Primary Examiner—John J. Love
Assistant Examiner—Donn McGiehen
Attorney, Agent, or Firm—Lyon & Lyon

[57] ABSTRACT

An oscillation control apparatus for an oscillation type vehicle in which a front frame for supporting a front wheel and being provided with a driver's seat and a rear frame for supporting a pair of right and left rear wheels are connected through a joint mechanism for making possible relative oscillation of both the frames to right and left, the apparatus comprising a hydraulic damper device for applying a damping force corresponding to the oscillation speed to the relative oscillation of both the frames to right and left, the damper device being provided between the front frame and the rear frame.

12 Claims, 11 Drawing Figures

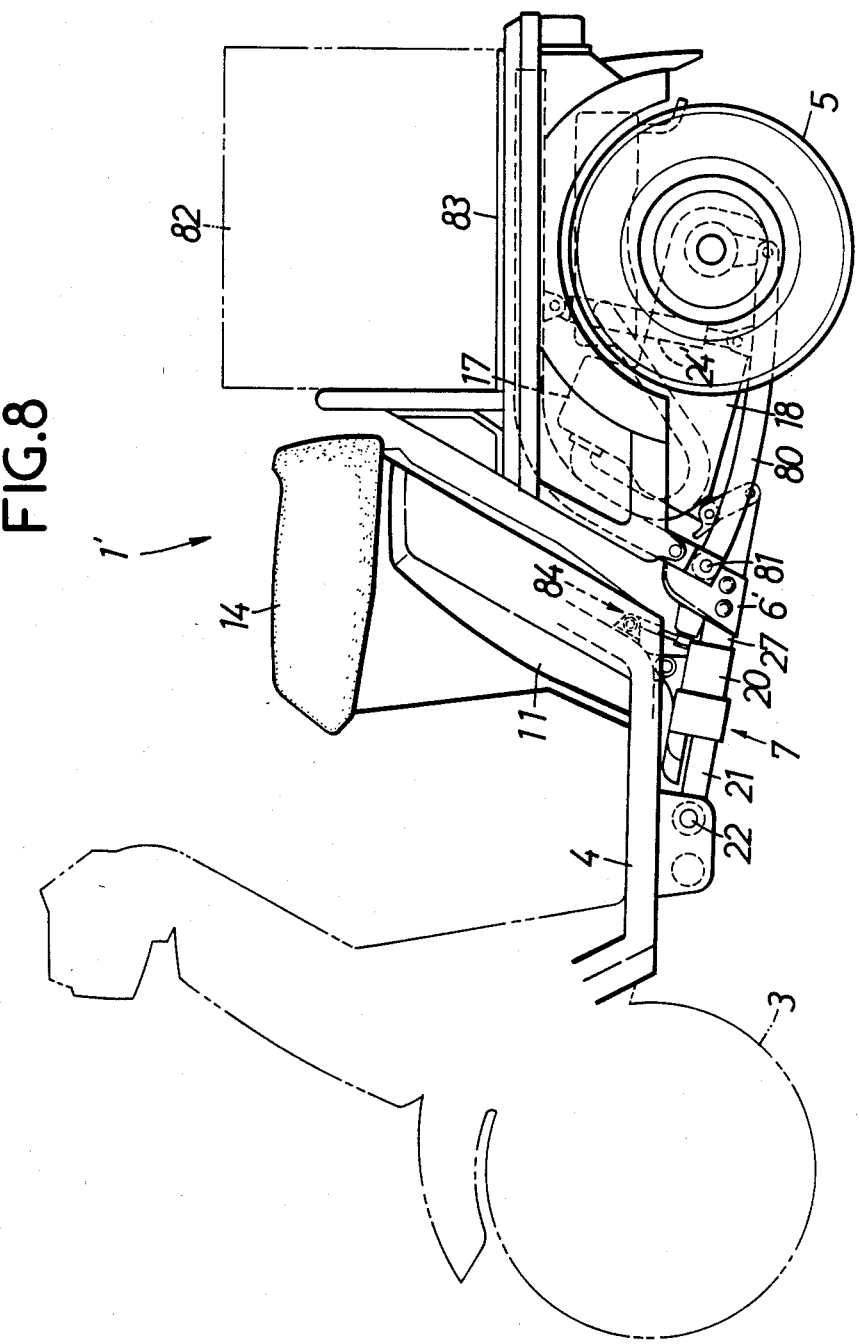

OSCILLATION CONTROL APPARATUS FOR OSCILLATION TYPE VEHICLE

BACKGROUND OF THE INVENTION

1. Field of the Invention

The present invention relates to an oscillation control apparatus for an oscillation type vehicle in which a front frame for supporting a front wheel and being provided with a driver's seat and a rear frame for supporting a pair of right and left rear wheels are connected through a joint mechanism to make possible relative oscillation of both the frames to right and left.

2. Description of the Prior Art

In the past, in such an oscillation type vehicle, a so-called Neidhart damper is installed on the joint mechanism which when the vehicle turns, allows the front frame to oscillate in a turning direction whilst normally imparting to the front frame a self-standing force.

In the aforesaid oscillation type vehcile, in the early stage of tilting, the spring force of the Neidhart damper is set to be small so that the front frame may be easily tilted while in the latter stage of tilting, the aforesaid spring force is set to be large. Because of this, within the small range of the angle of tilting of the front frame, flutter of the rear frame due to the unevenness of the road surface is liable to occur. When the spring force of the Neidhart damper is strengthened to solve this difficulty, the tilting property of the front frame is easily impaired.

SUMMARY OF THE INVENTION

The present invention has been achieved in view of the foregoing, and it is an object of the invention to provide an oscillation control apparatus for an oscillation type vehicle which can provide for a damping force corresponding to oscillation velocity with respect to the relative oscillation of both the frames to improve maneuvering feeling while maintaining the self-standing property of the front frame.

In accordance with the present invention, a hydraulic damper providing for a damping force corresponding to oscillation velocity with respect to relative oscillation of both the frames the to left and right is provided between the front and rear frames.

According to the above-described structure, as the oscillation velocity of the front frame increases. the damper effectively actuates to restrain the oscillation of the front frame to prevent the maneuvering feeling from being deteriorated. Accordingly, even if the Neidhart damper exhibits the spring force sufficient to maintain the self-standing property of the front frame, deterioration in the maneuvering feeling may be avoided.

The above and other objects, features and advantages of the present invention will become apparent from the description of the following preferred embodiments in connection with the accompanying drawings.

BRIEF DESCRIPTION OF THE DRAWINGS

FIG. 1 is a side view showing tbe entirety of an oscillation type vehicle,

FIG. 2 is an enlarged longitudinal sectional view showing the interior of a joint mechanism, FIG. 3 is a sectional view taken on line III—III of FIG. 2, FIG. 4 is a sectional view taken on line IV—IV of FIG. 2.

FIG. 5 is a sectional view taken on line V—V of FIG. 4,

FIG. 6 is an enlarged cross sectional view showing the internal construction of throttle means, and FIG. 7 is an enlarged perspective view showing the construction of a regulating valve; and FIGS. 8 to 11 show another embodiment of the present invention;

FIG. 8 is a side view showing the entirety of an oscillation type vehicle,

FIG. 9 is an enlarged exploded prespective view showing essential parts,

FIG. 10 is an enlarged sectional view taken on line X—X of FIG. 9, and

FIG. 11 is an enlarged sectional view taken on line XI—XI of FIG. 9.

DESCRIPTION OF THE PREFERRED EMBODIMENTS

Figure 1:
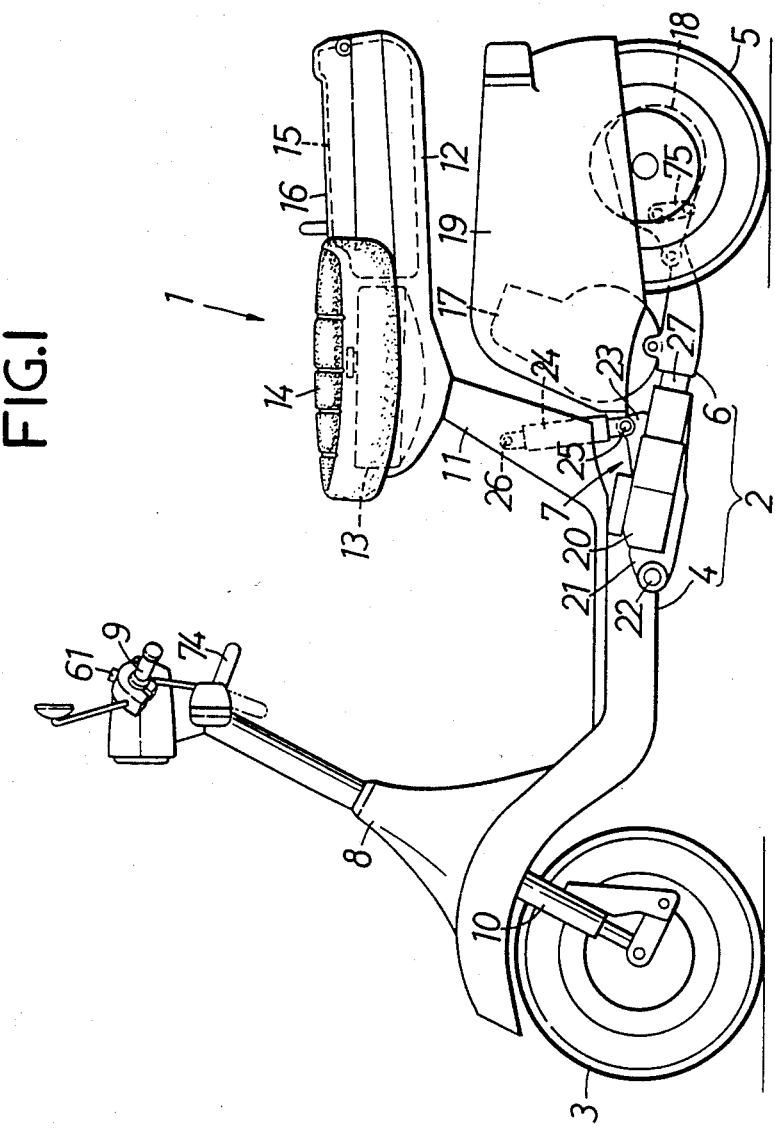
FIGS. 1 to 7 show one embodiment of the present invention.

The embodiments of the present invention will be described hereinafter by reference to the drawings. Referring first to FIG. 1 illustrating one embodiment of the present invention, a body 2 of an oscillation type vehicle 1 comprises a front frame 4 supporting a single front wheel 3 and a rear frame 6 supporting a pair of right and left rear wheels 5, 5, both frames 4, 6 being connected through a joint mechansim 7 to allow oscillation of the front frame 2 to the right and left.

On a head pipe 8 on the front end of the front frame 4 is rotatably carried a front fork 10 having a rod-like steering handle 9 mounted on the upper end thereof, and the front wheel 3 is supported on the lower end of the front fork 10. A seat post 11 is stood upright at the rear end of the front frame 4, and a rearwardly extending support portion 12 is provided integral with the upper end of the seat post 11. A fuel tank 13 is mounted near the front portion of the support portion 12, and a driver's seat 14 also serving as a cover for the fuel tank 13 is pivotally mounted so that it may be opened at the front portion of the support portion 12. A trunk 15 is provided near the rear portion of the support portion 12, and a carrier 16 also serving as a cover for the trunk 15 is pivotally mounted at the rear portion of the support portion 12.

The engine body 17 is mounted on the rear frame 6, and a pair of rear wheels 5, 5 as driving wheels are arranged on both right and left sides of a rearwardly extending transmission case 18 in a line with the engine body 17. The engine body 17, the transmission case 18 and both rear wheels 5, 5 are covered with a cover 19.

A pair of mounting bosses 21, 21 are provided spaced part laterally in the front of a casing 20 in the joint mechanism 7, the mounting bosses 21, 21 being connected to the rear portion of the front frame 4 by means of a horizontal pin 22 perpendicular to the lateral direction of the vehicle 1. With this, the joint mechanism 7 is pivotally mounted on the front frame 4 for oscillation upward and downward about the pin 22. A mounting boss 23 is projected on the upper portion at the rear and near the casing 20. The lower end of a vertically extending rear cushion 24 is pivotally mounted on the mounting boss 23 by means of a pin 25 parallel to the aforesaid pin 22 whilst the upper end of the rear cushion 24 is pivotally mounted on the intermediate portion of the seat post 11 by means of a pin 26 parallel to the pin 25.

Figure 2:
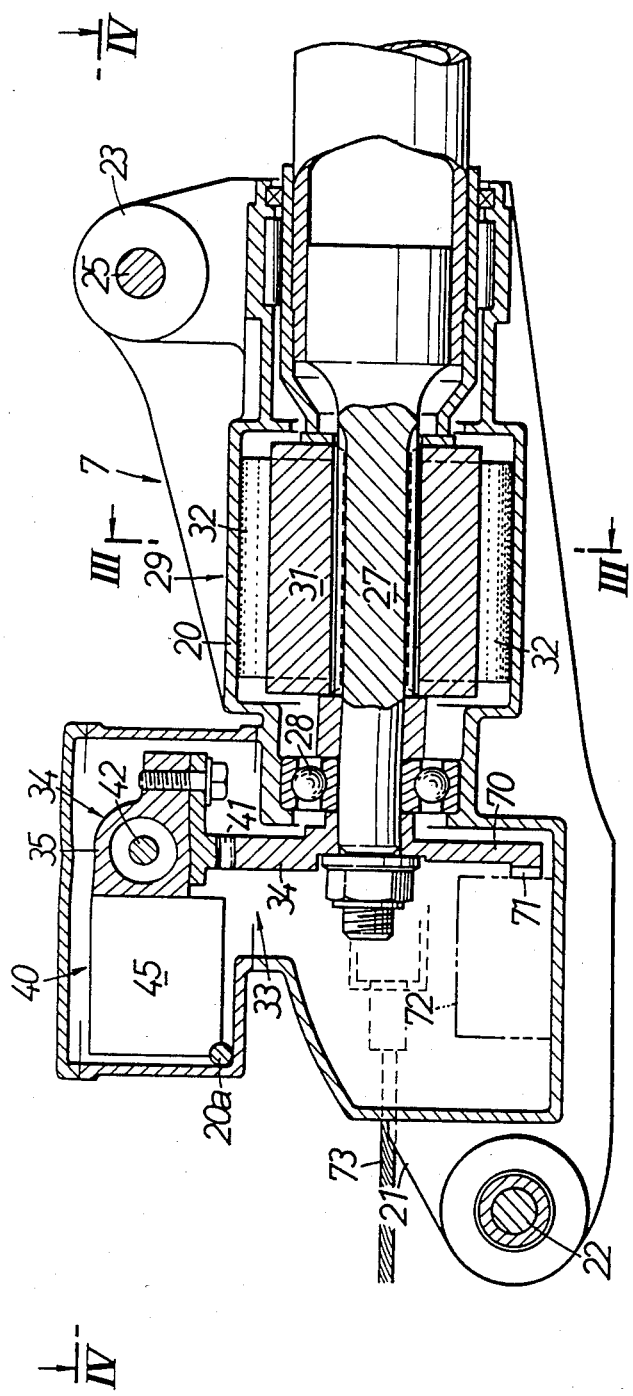

Referring to FIG. 2 together to FIG. 1, a rear end of an oscillation shaft 27 along the back and forth direction of the vehicle 1 is secured to the front portion of the rear frame 6, and the front portion of the oscillation shaft 27 is extended into the casing 20. A bearing 28 is interposed between the front end of the oscillation shaft 27 and the casing 20 so that the latter may be rotated about the oscillation shaft 27. Thus, the front frame 4 may be relatively oscillated rightward and leftward, and upward and downward relative to the rear frame 6.

Figure 3:
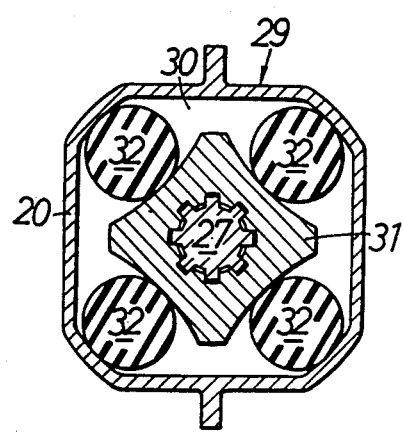

In FIG. 3, a well known Neidhart damper 29 is interposed between the casing 20 and the oscillation shaft 27. Namely, a spring chamber 30 having a rectangle in section is defined within the casing 20. An operating member 31 having an approximately square in section is spline-coupled to the oscillation shaft 27 within the spring chamber 30. Rubber-like elastic members 32, 32 . . . having a circle in section, which engage flat sides of the operating member 31, are filled at four corners within the spring chamber 30. In the Neidhart damper 29, when the casing 20 and osciallation shaft 27 are relatively rotated by the lateral oscillation of the front frame 4, the elastic members 32 are obliquely compressed and deformed by the flat sides of the operating member 31, and the front frame 4 is damped from oscillation by the spring action resulting from said compression.

Figure 4:
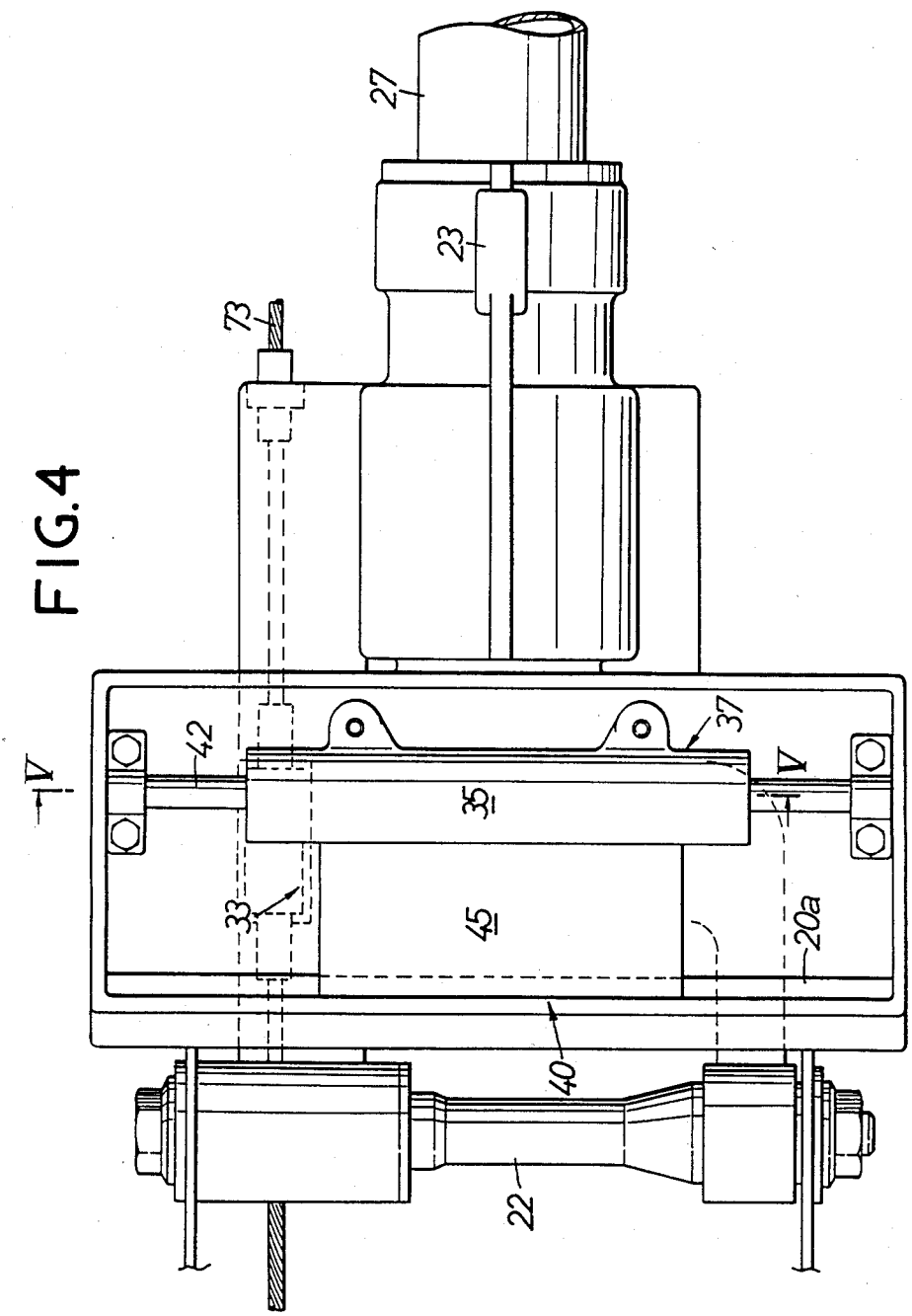
Figure 5:
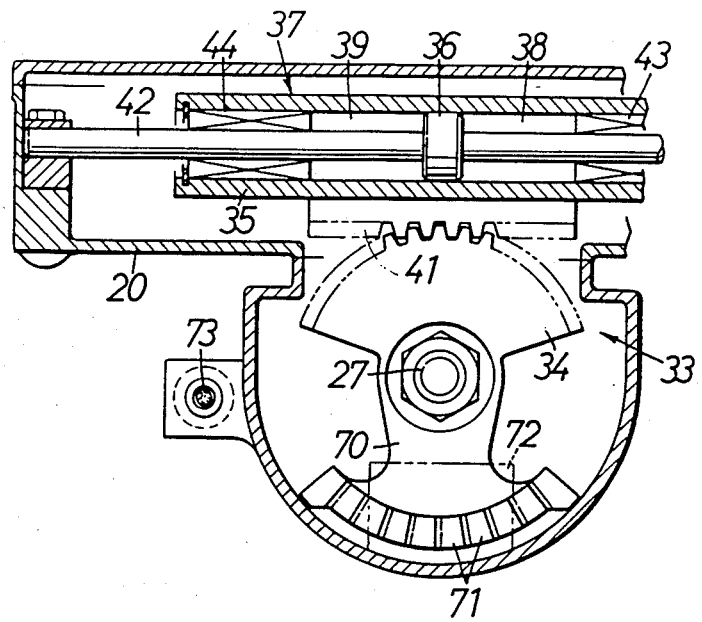

In FIGS. 4 and 5, a hydraulic damper 33 is interposed between the casing 20, which is checked for its lateral relative oscillation with the front frame 4, and the oscillation shaft 27 secured to the rear frame 6.

This hydraulic damper 33 comprises a fan pinion 34 spline-coupled to the front end of the oscillation shaft 27, a cylinder portion 37 for laterally relatively moving a piston 36 relative to a cylinder 35 by rotation of the pinion 34, and throttle means 40 for imparting resistance to a flow of working fluid between hydraulic chambers 38, 39 defined to right and left of the piston 36.

The cylinder portion 37 is approximately horizontally disposed perpendicular to the oscillation shaft 27 above the front end of the oscillation shaft 27. A rack 41 meshed with the pinion 34 is fixedly mounted on the cylindrical cylinder 35, and the piston 36 slidably fitted in the cylinder 35 is provided integrally in the central portion in an axial direction of a piston rod 42. Opposite end of the piston rod 42 are respectively secured to the casing 20, and seal members 42, 44 are interposed between the opposite ends of the cylinder 35 and the piston rod 42. Hydraulic chambers 38, 39 are interposed between the seal members 43, 44 and the piston 36.

In the cylinder portion 37 constructed as described above, the cylinder 35 is moved rightward and leftward in response to the relative rotation of the casing 20 with respect to the oscillation shaft 27. Thereby, the working fluid is transferred through the throttle means 40 between the right and left hydraulic chambers 38, 39.

Figure 6:
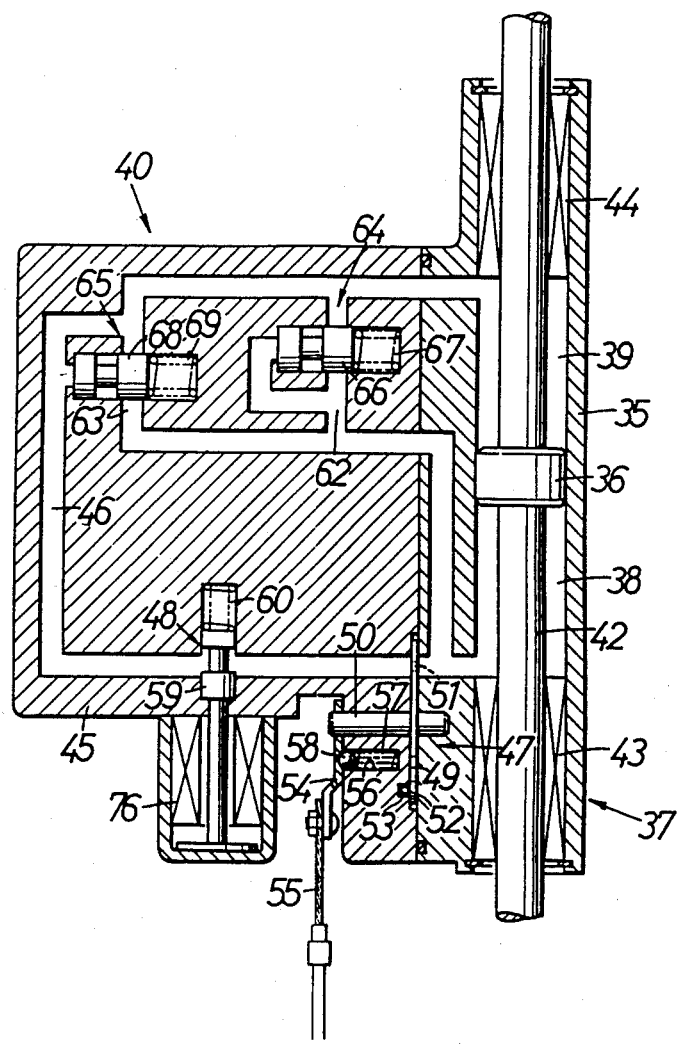

In FIG. 6, the throttle means 40 is constructed such that an oil passage 46 connecting between both the hydraulic chambers 38, 39 within the cylinder 35 is provided within a block body 45 integrally coupled to the side of the cylinder 35 and guided by a rail 20a provided on the casing 20. In the midst of the oil passage 46 are provided a regulating valve 47 for regulating a flow resistance of the oil passage 46 and an electromagnetic valve 48 for interrupting the oil passage to check the flow of working fluid between both the hydraulic chambers 38 39.

Figure 7:
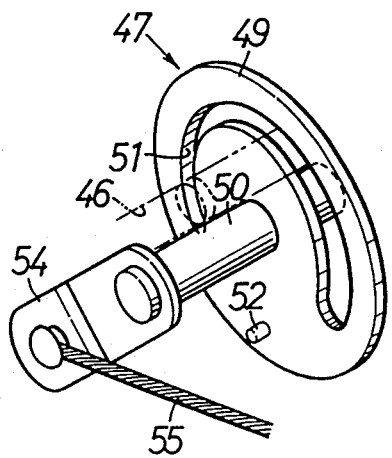

In FIG. 7, a valve body 49 of the regulating valve 47 is formed into a disc shape and is rotatably held between the cylinder 35 and the block body 45. A valve shaft 50 is integrally formed in the center of the valve body 49, the valve shaft 50 being extended externally of the block body 45. A valve bore 51 formed circularly about the valve shaft 50 is bored in the position corresponding to the oil passage 46 of the valve body 49. The valve bore 51 is formed so that as it changes its shape from one peripheral end toward the other, the radial width of the valve body 49 varies. In one surface of the valve body 49, a stopper 52 is projected at a position remote from the valve shaft 50, the stopper 52 being fitted in a guide groove 53 provided in a mating surface of the block body 45. This guide groove 53 is provided circularly about the valve shaft 50. The guide groove 53 is provided to determine its range so that the valve bore 51 always may face to the oil passage 46 irrespective of any rotative position of the valve body 49. That is, the regulating valve 47 never interrupts the oil passage 46.

The distal end of a rotational arm 54 extending radially and outwardly of the valve shaft 50 is secured to the end of the valve shaft 50 projected externally of the block body 45. An operating wire 55 is connected to the utmost end of the rotatioal arm 54, the operating wire 55 being extended to the upper portion of a head pipe 8 (see FIG. 1). The block body 45 is bored at its side with a bottomed hole 56 facing to the rotational arm 54, and a spherical member 58 is pressed against the side of the rotational arm 54 by means of a spring 57 encased within the bottomed hole 56. With this, the resistance acts on the rotation of the rotational arm 54 or the valve body 49 to retain the rotational position of the valve body 49 when the operating wire 55 is pulled by the operating portion (not shown) provided above the head pipe 8.

A valve body 59 of the electromagnetic valve 48 is biased in an opening direction by means of a spring 60, and when a solenoid 76 is energized, the valve body 59 is closed against the force of the spring 60. The energization of the solenoid 76 is controlled by means of an operating switch 61 disposed above the head pipe 8 as shown in FIG. 1.

Within the block body 45 are juxtaposed a pair of bypass passages 62, 63 connecting both the hydraulic chambers 38, 39 bypassing the regulating valve 47 and the electromagnetic valve 48. Unload valves 64, 65 are provided in the midst of these bypass passages 62, 63. On one end of a valve body 66 of one unload valve 64 acts the force of a spring 67 for biasing the valve body 66 in a closing direction, and on the other end of the valve body 66 acts oil pressure of the hydraulic chamber 38. Accordingly, when the force in the opening direction resulting from oil pressure of the hydraulic chamber 38 exceeds the force of the spring 67 in the closing direction, the unload valve 64 opens. On the other hand, a valve body 68 of the other unload valve 65 is biased toward the closing side by means of a spring 69 and biased toward the opening side by the oil pressure of the hydraulic chamber 39. Thus, when either oil pressure of the hydraulic chambers 38, 39 exceeds a preset valve determined by the springs 67, 69, either of the unload valves 64, 65 opens so that both the hydraulic chambers 38, 39 are brought into communication with each other bypassing the regulating valve 47 and the electromagnetic valve 48.

Particularly noting to FIGS. 2, 4 and 5, a fan stopper plate 70 is spline-coupled to the lower portion of the front end of the oscillation shaft 27. A plurality of engaging grooves 71 are provided in the edge of the stopper plate 70 in a circumferentially spaced relation. A parking lock mechansim 72 provided with pawls in engagement with these engaging grooves 71 is encased in and secured to the casing 20, the parking lock mechanism 72 being driven by means of a wire 73. The wire 73 is pulled by means of an operating lever 74 (see FIG. 1) pivotally mounted above the head pipe 8. When the lever 74 is rotated upwardly as indicated by the solid line in FIG. 1, the parking lock mechanism 72 actuates so that said pawl selectively comes into engagement with one of the engaging grooves 71. Accordingly, even when the rear wheels 5, 5 are on the sloped road, the head pipe 8 of the front frame 4 is made to assume its upright attitude to impede the relative rotation between the front frame 4 and the rear frame 6. whereby the front frame 4 may be self-stood.

The wire 73 is also connected to a brake arm 75 (see FIG. 1) of a parking brake, and the rear wheel 5 is locked by the upward rotation of the operating lever 74.

The operation of the above-described embodiment will be described hereinafter. When the oscillation vehicle 1 is desired to be turned, the front frame 4 may be tilted in the turning direction. After the turning, the self-standing force caused by the Neidhart damper 29 acts on the front frame 4, and the iront irame 4 returns to its original state. At that time, when the tilting angle of the front frame 4 is large, the Neidhart damper 29 exhibits the great spring force whereby the front frame 4 rapidly tends to return to its original state. At that time, the cylinder 35 of the hydraulic damper 33 laterally moves to thereby increase or reduce pressure within the hydraulic chambers 38, 39, resulting in a flow of working fluid between both the hydraulic chambers 38, 39. When the increase and reduction speed of the hydraulic chambers 38, 39, namely the oscillation speed of the front frame 4 is high, a great damping force due to the provision of the valve bore 51 of the regulating valve 47 acts to restrain the oscillation of the front frame 4. This phenomenon is similarly applied to the case where the rear frame 6 is laterally oscillated during the running of the vehicle on the uneven road, and the reaction caused by the spring force of the Neidhart damper 29 according to the oscillation angle thereof acts on the front frame 4, as a consequence of which the maneuvering feeling is improved.

Since the area facing to the oil passage 46 of he valve hole 51 in the regulating valve 47 can be adjusted and the damping force of the hydraulic damper 33 can be varied, the oscillation characteristic as desired by the driver may be obtained by operating the regulating valve 47.

When the vehicle 1 is desired to be stopped momentarily because of traffic signals or the like, the operating switch 61 is depressed to close the electromagnetic valve 48 to lock the hydraulic damper 33. In this way, the oscillation of the front frame 4 is impaired, and therefore the front frame 4 and the rear frame 6 are locked to prevent the front frame 4 from being fallen even when the driver's foot is not in touch with the ground. When locking occurs in the state where the front frame 4 is tilted, the driver's seat 14 may be forcibly pushed in the upright direction. This pressing force causes either pressure of the hydraulic chambers 38, 39 to exceed the preset value to open either of the unload valves 64, 65, whereby the lateral movement of the cylinder 35, that is, the rotation of the driver's seat 14 in the upright direction may be made.

While in the above-described embodiment, the piston rod 42 has been secured to the casing 20 to move the cylinder 35 in the lateral direction, it is to be noted that the arrangement reverse to the former can be employed. Furthermore, a hand-operated valve may be provided in place of the electromagnetic valve 48.

FIGS. 8 to 11 show a further embodiment of the present invention, in which parts corresponding to those of the previously described embodiment are indicated by the same reference numerals.

First, referring to FIG. 8, the front end of a rearwardly extending swing arm 80 is connected to a rear frame 6' through a horizontal pin 81, and the rear end of the swing arm 80 is connected to axles of a pair of rear wheels 5, 5. A cushion 24' is interposed between the rear frame 6' and the swing arm 80. A carrier 83 for placing a baggage 82 or the like thereon is provided at the rear of the rear frame 6'.

In the oscillation type vehicle 1' constructed as described above, a hydraulic damper 84 is provided between the front frame 4 and the rear frame 6' in order to sense the lateral oscillation of the rear frame 6' by the driver seated on the seat 14.

Figure 9:
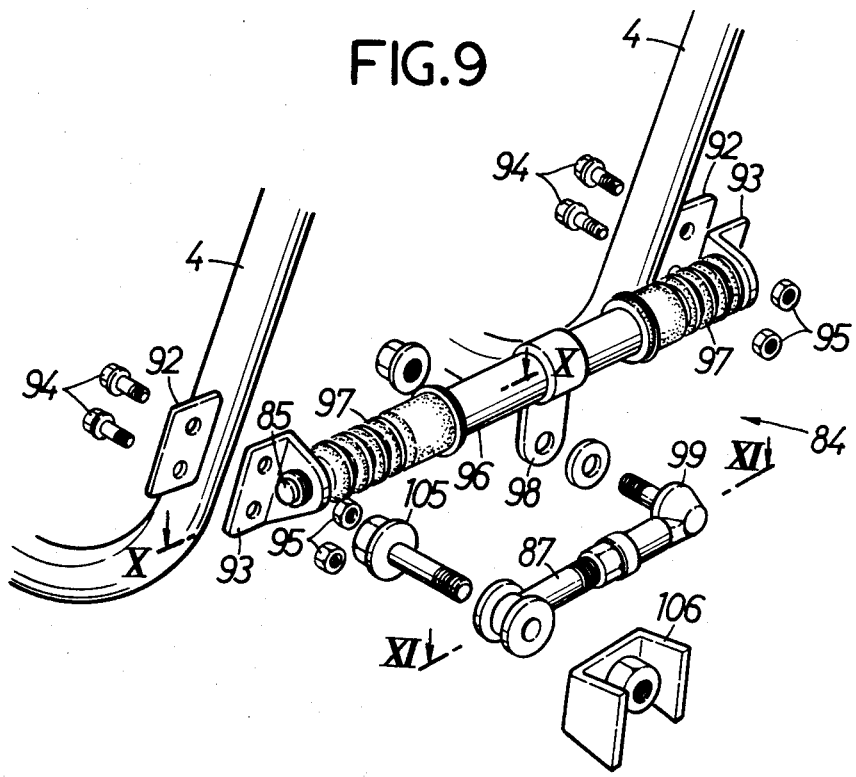
Figure 10:
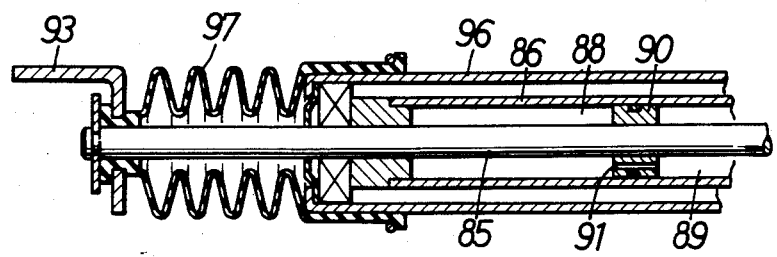
Figure 11:
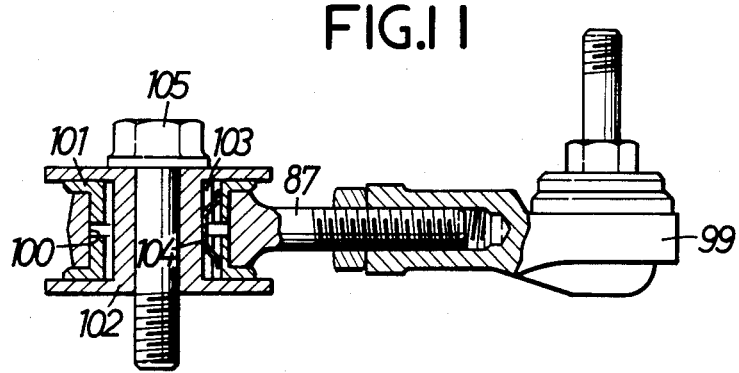

In FIGS. 9 and 11, the hydraulic damper 84 comprises a laterally horizontal piston rod 85 whose opposite ends are fixedly secured to the front frame 4, a cylinder 86 concentrically encircling the piston rod 85, a link 87 connecting between the cylinder 86 and the rear frame 6', a piston 90 secured to the axial middle portion of the piston rod 85 and defining hydraulic chambers 88, 89 to right and left to be slidably fitted in the cylinder 86, and an orifice 91 provided in the piston 90 as throttle means connecting between both the hydraulic chambers 88, 89.

A pair of right and left brackets 92, 92 are fixedly mounted on the front frame 4, and flange portions 93, 93 provided on both ends of the piston rod 85 are secured to the brackets 92, 92 by means of bolts 94, 94 and nuts 95, 95. The cylinder 86 is concentrically encircled by a cylindrical casing 96, and both ends of the casing 96 are substantially integrated with both ends of the cylinder 86. A flexible boot 97 encircling the piston rod 85 is provided between the both ends of the casing 96 and the flange portions 93, 93. An engaging portion 98 is provided in the outer periphery in the intermediate of the casing 96 so that the engaging portion 98 may be axially moved by the link 87 to thereby provide for the aixal relative movement between the piston 90 and the cylinder 86 to generate a damping force.

In FIG. 11, a ball joint 99 is mounted on one end of the link 86, the ball joint 99 being pivotally mounted on the aforesaid engaging portion 98. A hole 100 perpendicular to an axis is provided in the other end of the link 86, the hole 100 having a collar 102 fitted therein through a bushing 101. A predetermined gap 103 is formed between the bushing 101 and the collar 102, and a plurality of vibration-proof springs 104 are arranged in the gap 103. A bolt 105 is inserted into the collar 102, and the bolt 105 is threadedly mounted on a mounting portion 106 provided on the rear frame 6' whereby the other end of the link 87 is pivotally mounted on the rear frame 6'.

According to the aforementioned embodiment, when the rear frame 6' with a baggage 82 loaded thereon is subjected to rolling outwardly in a radial direction by the centrifugal force during running of the vehicle along the curve, the rolling movement is transmitted to the front frame 4 through the hydraulic damper 84 whereby the driver can sense the rolling movement of the rear frame 6'. In addition, at that time, it is possible to prevent the operating feeling from being deteriorated due to the damping force generated in the hydraulic damper 84. Since in the link 87, there is the gap 103 between the bushing 101 and the collar 102, slight oscillation of the rear frame 6' is not transmitted to the driver to avoid annoyance during the running.

What is claimed is:

1. An oscillation control apparatus for a vehicle having a front frame for supporting a front wheel and a driver's seat and a rear frame for supporting a pair of right and left rear wheels, the front and rear frames being connected through a joint allowing the front frame to tip left and right relative to the rear frame, comprising
    a spring mechanism between the front and rear frames at the joint to resiliently resist tipping of the front frame to the left and right relative to the rear frame; and
    a hydraulic damper between the front and rear frames at the joint to damp relative movement therebetween.

2. The oscillation control apparatus according to claim 1, wherein said hydraulic damper comprises a piston rod which is horizontal in a lateral direction, said piston rod having its both ends connected to one of the front frame and rear frame, a cylinder concentrically encircling said piston rod and being connected to the other of the front frame and rear frame, a piston provided in an axially intermediate position of the piston rod and slidably fitted into the cylinder to define hydraulic chambers on right and left-hands of the piston, and throttle means provided between both the hydraulic chambers.

3. The oscillation control apparatus according to claim 2, wherein the throttle means comprises, in the midway of an oil passage connecting both the hydraulic chambers, a regulating valve capable of regulating a flow resistance of said oil passage and an electromagnetic valve capable of interrupting said oil passage.

4. The oscillation control apparatus according to claim 2, wherein the piston is formed with an orifice as throttle means connecting both the hydraulic chambers.

5. The oscillation control apparatus according to claim 1, wherein said spring mechanism is a Neidhart joint and said hydraulic damper generates a larger damping force when the front frame is oscillated at a larger speed relative to the rear frame.

6. The oscillation control apparatus according to claim 5, wherein said hydraulic damper includes a pair of hydraulic chambers communicated with each other via an oil passage and adapted to conduct interchange of oil therebetween in response to the relative oscillation between the front and rear frames to left and right, throttle means being interposed in said oil passage.

7. An oscillation control apparatus for an oscillation type vehicle in which a front frame for supporting a front wheel and being provided with a driver's seat and a rear frame for supporting a pair of right and left rear wheels are connected through a joint mechanism for making possible relative oscillation of both the frames to the right and left, said apparatus comprising a hydraulic damper device for applying a damping force corresponding to the oscillation speed to the relative oscillation of both the frames to right and left, said damper device being provided between the front frame and the rear frame, said hydraulic damper device including a piston rod which is horizontal in a lateral direction, said piston rod having its both ends connected to one of the front frame and rear frame, a cylinder concentrically encircling said piston rod and being connected to the other of the front frame and rear frame, a piston provided in an axial direction of the piston rod and being slidably fitted in the cylinder while defining hydraulic chambers on the right and left hands, and throttle means provided between both the hydraulic chambers, an axially extending rack being fixedly mounted on the cylinder, and a pinion rotatable in response to relative oscillation of the rear frame to the front frame being meshed with said rack.

8. An oscillation control apparatus for an oscillation type vehicle in which a front frame for supporting a front wheel and being provided with a driver's seat and a rear frame for supporting a pair of right and left rear wheels are connected through a joint mechanism for making possible relative oscillation of both the frames to the right and left, said apparatus comprising a hydraulic damper device for applying a damping force corresponding to the oscillation speed to the relative oscillation of both the frames to right and left, said damper device being provided between the front frame and the rear frame, said hydraulic damper device including a piston rod which is horizontal in a lateral direction, said piston rod having its both ends connected to one of the front frame and rear frame, a cylinder concentrically encircling said piston rod and being connected to the other of the front frame and rear frame, a piston provided in an axial direction of the piston rod and being slidably fitted in the cylinder while defining hydraulic chambers on the right and left hands, and throttle means provided between both the hydraulic chambers, wherein the cylinder and the rear frame are connected through a link one end of which is pivotally mounted on the cylinder while the other being pivotally mounted on the rear frame.

9. An oscillation control apparatus for an oscillation type vehicle in which a front frame for supporting a front wheel and being provided with a driver's seat and a rear frame for supporting a pair of right and left rear wheels are connected through a joint mechanism for making possible relative oscillation of both the frames to the right and left, said apparatus comprising a hydraulic damper device for applying a damping force corresponding to the oscillation speed to the relative oscillation of both the frames to right and left, said damper device being provided between the front frame and the rear frame, said hydraulic damper device including a piston rod which is horizontal in a lateral direction, said piston rod having its both ends connected to one of the front frame and rear frame, a cylinder concentrically encircling said piston rod and being connected to the other of the front frame and rear frame, a piston provided in an axial direction of the piston rod and being slidably fitted in the cylinder while defining hydraulic chambers on the right and left hands, and throttle means provided between both the hydraulic chambers, wherein the throttle means comprises, in the midway of an oil passage connecting both the hydraulic chambers, a regulating valve capable of regulating a flow resistance of said oil passage and an electromagnetic valve capable of interrupting said oil passage and wherein a bypass passage by passing the regulating valve and the electromagnetic valve is provided between both the hydraulic chambers, and an unload is provided in said bypass passage, said unload valve being open when oil pressure of either or both the hydraulic chambers exceeds a preset value.

10. In an oscillation type vehicle having a front frame with a front wheel and a driver's seat carried thereon and a rear frame with a pair of rear wheels carried thereon, said front and rear frames being connected with each other via a joint mechanism for relative vertical and lateral oscillation therebetween, said joint mechanism including a casing vertically pivotally connected to said front frame and a Neidhart damper disposed between said casing and an oscillation shaft integral with said rear frame so as to encircle the oscillation shaft, an oscillation control apparatus which comprises a hydraulic damper device disposed between said front and rear frames, said damper device generating a damping force for dampening relative lateral oscillation between the frames, that dampening force becoming larger when the speed of the relative oscillation between the frames increases.

11. The oscillation control apparatus according to claim 10, wherein said damper device is arranged between said casing and said oscillation shaft, the device being associated with the oscillation shaft through a rack and pinion structure.

12. The oscillation control apparatus according to claim 10, wherein said damper device is arranged between the front and rear frames outside the casing of the joint mechanism, the device being associated with the rear frame through a link.

* * * * *